United States Patent [19]
DeBonth et al.

[11] 3,829,270
[45] Aug. 13, 1974

[54] HYDRODYNAMIC EXTRUSION DEVICE

[75] Inventors: Petrus Cornelis Wilhelmus DeBonth, Boekel; Halbe Osinga, Venlo; Cornelis Andries Verburg, Zaadam; Everhardus Albertus Muijdfrman, Emmasingel, all of Netherlands

[73] Assignee: U.S. Philips Corporation, New York, N.Y.

[22] Filed: Jan. 30, 1973

[21] Appl. No.: 328,018

[30] Foreign Application Priority Data
Feb. 8, 1972 Netherlands.................... 7201605

[52] U.S. Cl........... 425/381.2, 264/176 C, 425/207, 425/378
[51] Int. Cl.............................................. B29f 3/02
[58] Field of Search...... 264/176 C; 425/381.2, 378, 425/376, 207, 86

[56] References Cited
UNITED STATES PATENTS

| | | | |
|---|---|---|---|
| 3,248,755 | 5/1966 | Plymale ...................... | 425/381.2 X |
| 3,277,528 | 10/1966 | Nikiforov..................... | 425/381.2 X |
| 3,355,764 | 12/1967 | Moyer.......................... | 425/381.2 X |
| 3,570,394 | 3/1971 | Christy et al. .................... | 425/86 X |
| 3,689,181 | 9/1972 | Maxwell....................... | 425/381.2 X |

FOREIGN PATENTS OR APPLICATIONS

| | | | |
|---|---|---|---|
| 346,148 | 4/1931 | Great Britain..................... | 425/267 |

*Primary Examiner*—R. Spencer Annear
*Assistant Examiner*—Mark Rosenbaum
*Attorney, Agent, or Firm*—Frank R. Trifari

[57] ABSTRACT

A hydrodynamic extrusion device for processing viscous and elastoviscous materials, in particular thermoplastic synthetic materials, which device comprises two circular discs which are placed at a small axial distance and of which one forms part of a rotor and the other one forms part of a stator. A pattern of logarithmic spiral grooves is provided on one of the discs on the surface facing the other disc, which grooves, in cooperation with the smooth surface of the other disc and upon relative rotation of the two discs, produce both a hydrodynamic pressure build-up and a centripedal material transport.

5 Claims, 3 Drawing Figures

HYDRODYNAMIC EXTRUSION DEVICE

The invention relates to a hydrodynamic extrusion device for processing viscous and elastoviscous materials, in particular thermoplastic synthetic materials. The device comprises two circular discs which are placed at a small axial distance and coincide with their center lines. One of the said discs forms part of a stator and the other one forms part of a rotor, the surfaces of the two discs facing each other being constructed as a hydrodynamically operating viscosity pump producing a pressure build-up and having a flat slot-like working space which communicates with a supply device on the circumference of the discs and with a central extrusion aperture in one of the discs.

In processing thermoplastic synthetic materials in an extrusion device, the material to be processed is supplied in the form of grains or powder mixed or not mixed with stabilizers, pigmentation agents and/or other additions and is melted, kneaded and mixed to form a homogeneous mass with the simultaneous supply or removal of thermal energy. The degree of homogenisation of the material is decisive of the quality of the ultimate product.

In a known extrusion device of the type mentioned in the above introduction, the stator disc is provided with a number of recesses which succeed each other in the circumferential direction and have a height which increases in the direction of rotation of the rotor; upon rotation of the rotor and in cooperation with the smooth surface of the rotor disc, the hydrodynamic pressure build-up in the supplied material is produced in the recesses as a result of a wedge effect. As compared with other known extrusion devices, the elastodynamic extrusion devices, which are provided with two smooth discs and the operation of which is based on centripetally directed normal forces which are produced in the elastoviscous material by relative rotation of the two discs, the first-mentioned device has the advantage that higher pressures and a higher output can be obtained; the centripetal material transport, however, takes place as a result of normal forces produced in the elastoviscous mass and is moreover adversely influenced by centrifugal forces. An additional drawback of said extrusion device is that each recess must be provided with an outflow aperture and that both the recesses and the outflow apertures must be provided either on the rotor or on the stator so as to prevent fluctuations of the pressure in the extrusion aperture.

It is the object of the present invention to provide a hydrodynamic extrusion device which, in spite of a simple construction, has a higher efficiency than the known hydrodynamic extrusion device.

According to the invention, this object is mainly achieved in that a pattern of logarithmic spiral grooves is provided on one of the two discs on the surface thereof facing the other disc, which grooves, in cooperation with the smooth surface of the other disc and upon relative rotation of the two discs, produce both a hydrodynamic pressure build-up and a centripetal material transport.

By the mere hydrodynamic action of the shallow spiral grooves, which is known per se, a stronger pressure buildup can already be obtained than with devices based on the wedge effect. Moreover, as a result of the combination effect of the pattern of spiral grooves, the material transport in the radial direction and hence a high output are ensured. The uniform flow pattern and the characteristic pressure distribution of the pattern of spiral grooves results in a very regular output. The additional advantage of the pattern of spiral grooves is that an increase in scale is associated with a quadratic pressure increase.

It is to be noted that it is known to provide a disc-shaped rotor of an elastodynamic extrusion device with a single relatively deep spiral-like transport groove to improve the transport of material in the radial direction; however, said transport groove does not provide an essential contribution to the pressure build-up and moreover results in a disturbance of the centripetal normal forces.

In a preferred embodiment of the hydrodynamic extrusion device according to the invention, the pattern of spiral grooves is annular, the inner circumference of the pattern enclosing a mixing space. The material emerging from the spiral groove part and prior to entering the extrusion aperture is subjected in the mixing space to an intensive mixing operation as a result of which the homogeneity of the mass is increased.

By maintaining a constant width of the spiral grooves, in which the dams between the spiral grooves have a width decreasing in the direction of the center of the pattern of the spiral grooves, clogging of the spiral grooves upon processing materials having a high softening temperature, in particular thermoplastic synthetic materials, is prevented.

In another preferred embodiment of the hydrodynamic extrusion device according to the invention, the stator is cylindrical and the rotor is piston-like in known manner; according to the invention this device is characterized in that the supply device is formed by the inner circumference of the stator and the outer circumference of the rotor constructed as a screw pump. As a result of this, the material can be supplied in a dosed manner and over the whole circumference of the working space. Early softening of the material during transport is prevented by cooling the relevant stator part and/or rotor part.

In order to compensate for any irregularities in the output of the screw pump and to ensure a uniform supply, a further preferred embodiment of the hydrodynamic extrusion device according to the invention is characterized by an annular softening space which encloses the pattern of spiral grooves and which has an axial height decreasing in the direction of the centre line of the extrusion device.

The invention will be described in detail with reference to an embodiment shown in the drawing.

Figure 1:
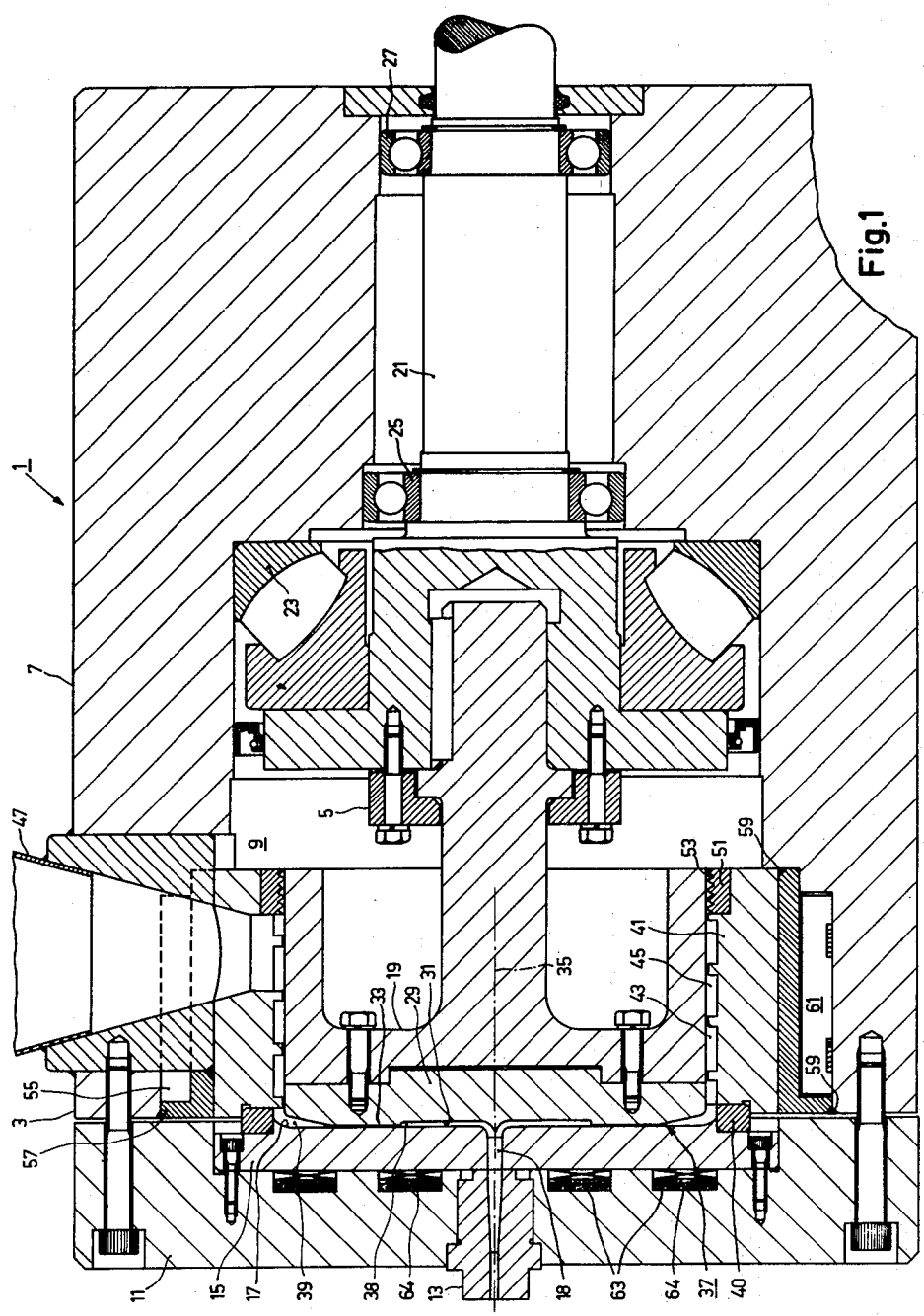
FIG. 1 is a longitudinal sectional view of a hydrodynamic extrusion device according to the invention.

The extrusion device shown in FIG. 1 consists of a multi-part stator 3 and a rotor 5 which is composed of several parts. The stator 3 comprises a housing 7 having a cylindrical cavity 9 which is closed at one end by a cover 11 which is provided with an extrusion nozzle 13. A circular disc 15 having a smooth inner surface 17 and a central outflow aperture 18 is provided on the inside of the cover 11. The rotor 5 comprises a piston-like head 19 which is connected to a driving shaft 21 which is rotatably journalled in the housing 7 by means of a roller bearing 23 and ball bearings 25 and 27. A circular disc 29 is provided on the end face of the head 19. The disc 29 comprises an annular pattern 33 of spiral grooves provided on the surface 31 facing the disc 15. The stator 3, the rotor 5 and the two discs 15 and 29 have a common center line 35, the stator and the rotor being journalled relative to each other in such manner that a flat slot-like working space 37 is formed between the two discs 15 and 29. The working space 37 comprises the already mentioned annular spiral groove part 31, a mixing space 38 enclosed by the inner circumference of the spiral groove part and obtained by a central recess in the disc 29, and an annular softening space 39 which encloses the spiral groove part and which has been obtained by bevelling the free edge of the disc 29. The axial distance between the two discs 15 and 29 is determined by an exchangeable spacing ring 40.

At the level of the head 19 of the rotor, an annular element 41 having a helical groove 43 is provided in the housing 7, which groove, in cooperation with the non-profiled circumference 45 of the head 19, serves as a supply and dosing pump. On the inlet side, the groove 43 communicates with a filling funnel 47 and opens on the outlet side into the softening space 39 the axial height of which gradually decreases in the direction of the centre line 35. At the end facing the driving shaft 21, the head 19 is surrounded by a sealing element 51 having screwthread 53, the direction of which screwthread is equal to that of the groove 43. The end 41 is surrounded by an annular cooling space 55 which is formed by means of a ring 57 which is connected to the housing 7 in a sealing manner by welding seams 59. The cooling space 55 communicates with a cooling water inlet and outlet via connections, not shown, on either side of a partition 61. Heater elements 64 for the supply of thermal energy of the disc 15 to the material to be processed are provided in annular recesses 63 of the cover 11.

Figure 2:
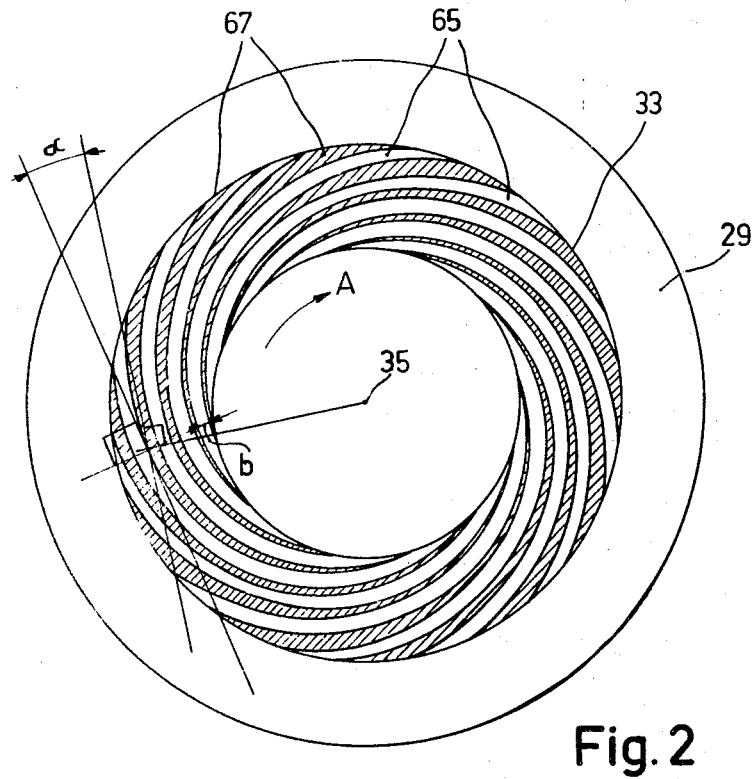
FIG. 2 is a cross-sectional view taken on the line II—II of FIG. 3.

FIG. 2 is a cross-sectional view of the rotor at the level of the spiral groove part with the annular pattern 33 of parallel logarithmic spiral grooves 65 having a constant width $b$, a constant depth $d$ (FIG. 3) and an angle of inclination $\alpha$. The spiral grooves 65 are separated from each other by dams 67 the width of which decreases in the direction of the centre line 35. The direction of rotation of the rotor 5 is denoted by the arrow A.

The extrusion device 1 is arranged so that the filling funnel 47 is located uppermost. In the operating device the thermoplastic material to be processed is supplied through the filling funnel 47 in the form of grains or powder. The supply and dosing pump 43, 45 then transports the material to the annular softening space 39, too early a heating of the material being prevented by cooling of the element 51. Since the supply and dosing pump 43, 45 communicates with the space 39 substantially along the entire circumference thereof and as a result of rotation of the rotor the material is uniformly supplied and distributed over the circumference of the space 39, as a result of which any irregularities in the output of the supply and dosing pump are compensated for. A first mixing of the material and a softening thereof by contact with the heated disc 15 occurs in the space 39 as a result of which the material becomes elastoviscous. In the spiral groove part 33 the material is subjected to an intensive kneading and mixing operation and processed to a homogeneous mass by further supply of thermal energy. As a result of the hydrodynamic operation of the spiral grooves, both a pressure build-up in the material and the radial transport hereof in the direction of the mixing space 38 are produced and in the mixing space the material is subjected to a final mixing operation. The thus treated homogeneous elastoviscous material is forced via the outflow aperture 18 through the extrusion nozzle 13.

Figure 3:
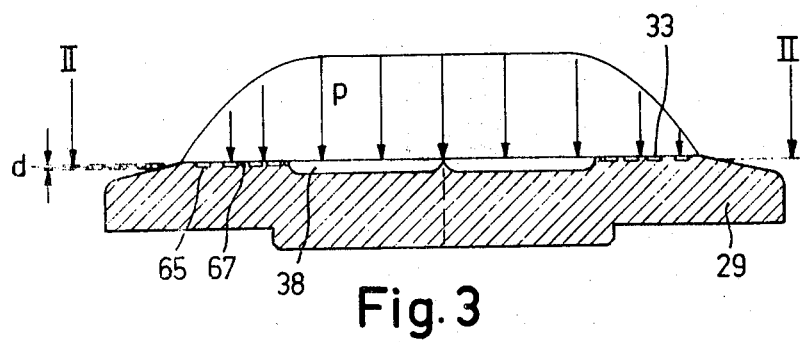
FIG. 3 shows the pressure distribution over the rotor viewed in a diametrical plane.

FIG. 3 shows the pressure distribution which is characteristic of the pattern of spiral grooves viewed diametrically across the rotor. The pressure distribution is parabolic across the spiral groove part 33 and constant across the mixing space 39.

In and embodiment of the device according the invention tested in practice the disc 29 had a diameter of 200 mm. The free space between the two discs 15 and 29 was 0.2 mm; the annular spiral groove pattern having 12 spiral grooves had an inner diameter of 90 mm and an outer diameter of 150 mm; the spiral grooves had a depth of 0.6 mm and a constant width of 4.25 mm. The angle of inclination $\alpha$ of the pattern of spiral grooves was 12°.

In the embodiment described the spiral grooves 65 are provided on the disc 29 of the rotor for practical reasons; the same operation is obtained if the disc 15 of the stator is provided with spiral grooves. By replacing the disc 29 by a disc having a different pattern of spiral grooves as well as by exchanging the spacing ring 40 for a ring having a different thickness, the pressure and the output can be influenced and the device may be adapted to the properties of different materials.

What is claimed is:

1. A hydrodynamic extrusion device for processing viscous and elastoviscous materials, in particular thermoplastic synthetic materials, which device comprises two circular discs which are placed at a small axial distance and coincide with their centre lines, one of said discs forming part of a stator and the other one forming part of a rotor, the surfaces of the two discs facing each other being constructed as a hydrodynamically operating viscosity pump producing a pressure build-up and having a flat slot-like working space which communicates with a supply device on the circumference of the discs and with a central extrusion aperture in one of the discs, a pattern of logarithmic spiral grooves being provided on one of the two discs on the surface thereof facing the other disc, which grooves, in cooperation with the smooth surface of the other disc and upon relative rotation of the two discs, produce both a hydrodynamic pressure build-up and a centripetal material transport.

2. A hydrodynamic extrusion device as claimed in claim 1, wherein the pattern of spiral grooves is annular, the inner circumference of the pattern enclosing a mixing space.

3. A hydrodynamic extrusion device as claimed in claim 1 wherein the spiral grooves have a constant width.

4. A hydrodynamic extrusion device as claimed in claim 1, in which the stator is cylindrical and the rotor is piston-like, and wherein the supply device is formed by the inner circumference of the stator and outer circumference of the rotor constructed as a screw pump.

5. A hydrodynamic extrusion device as claimed in claim 4, further comprising an annular softening space which encloses the pattern of spiral grooves and which has an axial height decreasing in the direction of the centre line of the extrusion device.

* * * * *

PO-1050
(5/69)

UNITED STATES PATENT OFFICE
CERTIFICATE OF CORRECTION

Patent No. 3,829,270          Dated August 13, 1974

Inventor(s) PETRUS CORNELIS WILHELMUS MARIA DE BONTH ET AL

It is certified that error appears in the above-identified patent and that said Letters Patent are hereby corrected as shown below:

In the Heading:

Inventors: "Petrus Cornelis Wilhelmus DeBonth" should be

--Petrus Cornelis Wilhelmus Maria DeBonth--

"Muijdfrman" should be --Muijderman--

Column 3, line 56, "51" should be --41--

Signed and sealed this 19th day of November 1974.

(SEAL)
Attest:

McCOY M. GIBSON JR.          C. MARSHALL DANN
Attesting Officer          Commissioner of Patents